United States Patent [19]

Spaeth et al.

[11] Patent Number: 4,875,750
[45] Date of Patent: Oct. 24, 1989

[54] OPTOELECTRONIC COUPLING ELEMENT AND METHOD FOR ITS MANUFACTURE

[75] Inventors: Werner Spaeth, Holzkirchen; Guenther Waitl, Regensburg; Werner Kuhlmann, Munich; Hans-Ludwig Althaus, Lappersdorf; Rolf Birkmann, Laaber; Waltraud Klos, Regensburg; Axel Schubert, Munich, all of Fed. Rep. of Germany

[73] Assignee: Siemens Aktiengesellschaft, Berlin and Munich, Fed. Rep. of Germany

[21] Appl. No.: 151,372

[22] Filed: Feb. 2, 1988

[30] Foreign Application Priority Data

Feb. 25, 1987 [DE] Fed. Rep. of Germany ....... 3706103

[51] Int. Cl.$^4$ .............................................. G12B 6/32
[52] U.S. Cl. ............... 350/96.18; 350/96.20; 350/96.15; 350/416
[58] Field of Search ............... 350/96.20, 96.21, 96.22, 350/96.11, 96.12, 96.13, 96.14, 96.15, 96.17, 96.18, 416; 357/17, 19, 30, 74; 250/227, 552, 553

[56] References Cited

U.S. PATENT DOCUMENTS

| 2,388,242 | 11/1945 | Arndt et al. | 310/331 |
| 3,397,278 | 8/1968 | Pomerantz et al. | 171/327 |
| 4,119,363 | 10/1978 | Camlibel et al. | 174/52 |
| 4,292,512 | 9/1981 | Miller et al. | 250/205 |
| 4,303,304 | 12/1981 | Ruiz | 350/96.20 |
| 4,357,072 | 11/1982 | Goodfellow et al. | 428/408 |
| 4,382,113 | 5/1983 | Schwartz et al. | 350/96.20 |
| 4,479,698 | 10/1984 | Landis et al. | 350/96.20 |
| 4,699,449 | 10/1987 | Lam et al. | 350/96.11 |
| 4,725,115 | 2/1988 | Beasley | 350/96.18 |
| 4,726,648 | 2/1988 | Haberland et al. | 350/96.20 |
| 4,740,259 | 4/1988 | Heinen | 156/234 |

FOREIGN PATENT DOCUMENTS 0121402 10/1984 European Pat. Off. .
0126003 11/1984 European Pat. Off. .
3307466 3/1983 Fed. Rep. of Germany .
3430762 8/1984 Fed. Rep. of Germany .
2440563 5/1980 France .
59-101881 6/1984 Japan .
2128768 5/1984 United Kingdom .
2146841 4/1985 United Kingdom .

Primary Examiner—Frank Gonzalez
Attorney, Agent, or Firm—James G. Morrow

[57] ABSTRACT

An optoelectronic coupling element and method for manufacturing the coupling element. The coupling element includes a light wave guide, a microlens, a first carrier chip and a light emitting and/or light detecting semiconductor element. The microlens is preferably spherical in shape and is adapted for optically coupling the light wave guide and the semiconductor element. The semiconductor element can be part of the first carrier chip or, according to another embodiment, can be part of a second carrier chip. The purpose of this coupling element is to facilitate the precise mounting of the microlens in a position between the light wave guide and the semiconductor element and also facilitate the adjustment of the microlens to optimally perform its light coupling function. The method for manufacturing the coupling element provides for the formation of a receptacle having trapezoidal shape sides in the carrier chip. The microlens is mounted within the receptacle with a connecting medium such as glass. The size of the receptacle is determined by the size of the microlens and the point of contact between the microlens and carrier. Applications of the optoelectronic coupling element according to the invention are, in particular, in LED transmitter structural elements, receiver structural elements and laser modules. This method of production substantially avoids impairment of the carrier chip due to effects such as mechanical deformation. Additionally, this type of coupling element can be mass-produced cost-effectively in spite of the miniature size of these components.

6 Claims, 2 Drawing Sheets

OPTOELECTRONIC COUPLING ELEMENT AND METHOD FOR ITS MANUFACTURE

BACKGROUND OF THE INVENTION

1. Field of Invention

This invention relates to an optoelectronic coupling element and method for its manufacture, and more particularly this invention relates to an optoelectronic coupling element including a light wave guide, semiconductor light transducer and a microlens as an optic coupling device.

2. Description of Related Art

U.S. Pat. No. 4,741,796 discloses an optoelectronic coupling element and a method for its production. Some of the technical problems associated to combining the components of coupling elements are discussed in this application.

In receiver and transmission systems using light wave guides, optical lenses are used to couple a semiconductor component to a light wave guide so that light can be transferred between the component and light wave guide. The coupling of semiconductor components and light wave guides gives rise to a number of problems. For example: the lens, semiconductor component and light wave guide must be positioned relative to each other such that their positions are within a tolerance range of 1 micrometer; the lens cannot be easily adjusted for purposes of obtaining optimal coupling; the performance of the semiconductor component can be impaired due to effects such as mechanical deformation; and the small size of the components (lens diameters between 100 and 500 micrometers) inhibits cost-effective mass production.

Various methods have been employed for mounting the lens in an optoelectronic coupling element. For example, an optical lens can be grown directly on a semiconductor chip, an optical lens can be fastened directly on a semiconductor chip, and a semiconductor chip can be mounted in a housing with a lens cap. These methods have a disadvantage in that no defined distances between the semiconductor chip and the optical lens are settable, thus the tolerances held on the location of the optical lens are relatively large.

SUMMARY OF THE INVENTION

The invention relates to an optoelectronic coupling element with a light wave guide, semiconductor light transducer and a microlens as a coupling means, wherein the microlens is mounted very accurately at a precisely defined position between the light wave guide and the semiconductor light transducer. The semiconductor light transducer can be light emitting and/or light detecting. The microlens is adjustable so that optimal light coupling between the transducer and the light wave guide is possible. Additionally, the invention is intended to minimize impairment of the transducer due to effects such as mechanical deformation. The coupling element, in spite of the miniature size of the components, is intended to be manufactured cost-efficiently at high production rates.

Accordingly, there is provided an optoelectronic coupling element comprising a light wave guide, a semiconductor light transducer, a microlens for optically coupling the light wave guide and the semiconductor light transducer, a carrier chip defining a lens receptacle, the lens receptacle having a truncated pyramid shape and connecting means for fixing the microlens in the lens receptacle. Additionally, there is provided a method for manufacturing the optoelectronic coupling element comprising the steps of anisotropically etching a receptacle into a lens carrier chip and fastening a microlens into the receptacle with a connecting means.

One advantage of the invention is that more than one optoelectronic coupling element having a glass sealed spherical lens can be manufactured simultaneously. In the manufacturing process, etching the carrier, glassing (glazing) the carrier, connecting the lens to the carrier using a glass solder, tempering the lens and optically finishing the lens can be performed while the coupling elements are connected. If glass solder is used as a connecting medium, all connections are stable to temperatures up to 400° C. With this type of construction organic substances are not needed. Another advantage is that with an arrangement including one spherical lens and a silicon carrier chip, the arrangement can be manipulated with assembly forceps.

In one embodiment of the invention, the carrier chip consists of a semiconductor material, preferably silicon, having an etched receptacle. The receptacle is adapted to contain a lens, such as a sapphire, spinel or glass lens, wherein the lens is preferably fastened into the receptacle with a glass solder. The size of the receptacle is dependent on the lens size and lens carrier contact point.

In the embodiments of the invention it is preferable to temper the lenses optically. In addition, it is preferable to provide for a lens carrier having a metallic underside. The metallic underside facilitates the soldering of the carrier on an insulating frame part.

DETAILED DESCRIPTION

Figure 1:
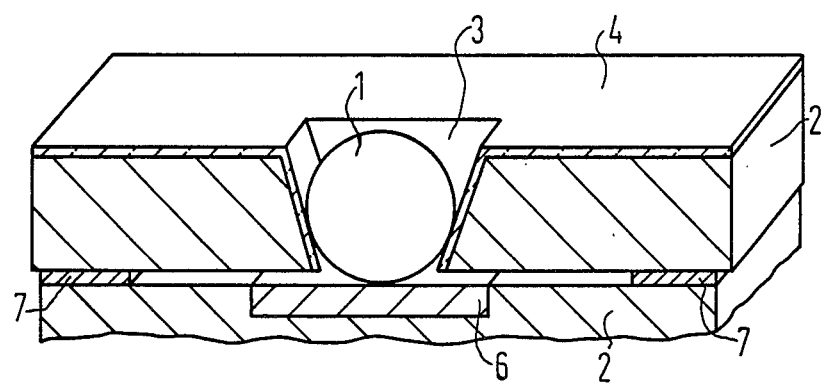
FIG. 1 is a cross-sectional view of a first embodiment of an optoelectronic coupling element according to the invention.
Figure 2:
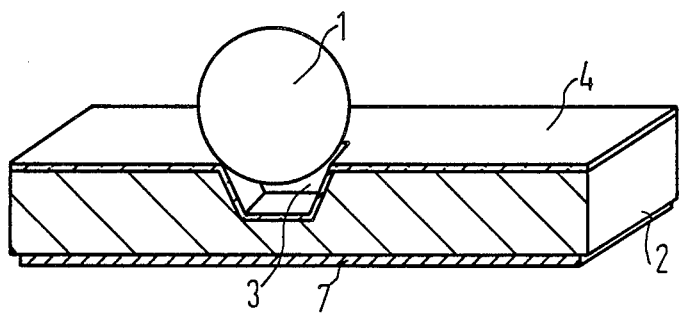
FIG. 2 is a cross-sectional view of a second embodiment of an optoelectronic coupling element according to the invention.

Turning to the drawings, the optoelectronic coupling element shown in FIG. 1 consists essentially of a carrier chip 2 made of silicon, through which a receptacle 3 in the form of a truncated pyramid-shaped hole has been etched anisotropically. A microlens 1 is located within the receptacle 3. In this embodiment a sapphire sphere microlens 1 with a diameter of approximately 300 micrometers has been used. To fasten the microlens 1 in the receptacle 3 a glass solder layer 4 of approximately 8 micrometers receptacle thickness is used. The glass solder layer 4 extends into the receptacle 3 and covers the carrier chip 2 at least in the region of the receptacle 3. The glass solder layer 4 fastens the microlens 1 directly to the carrier chip 2. The carrier chip 2 has metallic areas 7 at the edges of its underside for soldering to a second carrier chip 9 or a metallized insulator (ceramic) carrier part not shown here. In FIG. 2 the metallic area is in contact with an additional carrier chip 9. By way of example, the metallic area 7 can be manufactured from a TiPtAu material.

The light emitting or light detecting semiconductor light transducer 6 is located at a distance of 10 micrometers below the microlens 1 on the additional carrier 9 and the light wave guide (not shown), for example an optic fiber, is located at a somewhat greater distance above the microlens 1. By way of example, an infrared luminesence diode (IRED), producing light having a 1.3 micrometer wave length and a luminous spot of 20 micrometers diameter, can be used as a light transducer. Additionally the light transducer can take the form of a photo diode or laser diode.

In the optoelectronic coupling element shown in FIG. 2, a receptacle 10 is anisotropically etched in the shape of a truncated pyramid into the carrier chip 2 which preferably consists of silicon. The surface of the carrier chip 2, defining the receptacle 10, is covered with a glass solder layer 4 of approximately 8 micrometers thickness. This solder layer 4 serves as a connecting means for fastening the sapphire sphere microlens 1 directly on the carrier chip 2. The carrier chip 2 shown in FIG. 2 is also provided with a metallic area 11 on its underside for soldering the carrier chip 2 firmly to a metallized insulator (not shown). By way of example, the metallic area 7 can be manufactured from a TiPtAu material.

In the embodiment of the invention illustrated in FIG. 2 a light emitting or light detecting semiconductor light transducer (not shown) can be located in front of the microlens 1, and a light wave guide (not shown), such as an optic fiber, can be located behind the microlens 1. It is also possible to mount the semiconductor light transducer and the light wave guide directly on the carrier chip 2.

Figure 3:
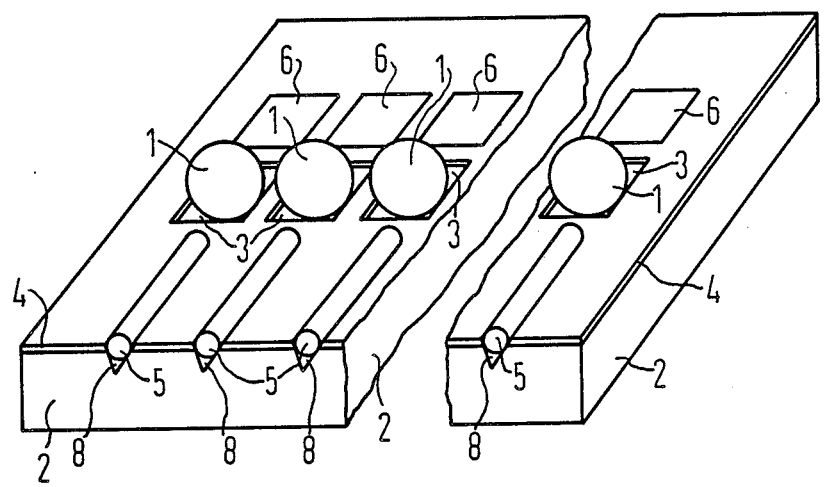
FIG. 3 is a perspective view of several optoelectronic coupling elements.

The embodiments according to FIG. 1 and FIG. 2 can be developed as a microlens array which can be produced in as a composite, if, for example, a large number of semiconductor light transducers are physically coupled. Such coupling can be developed as a detachable connection so that the individual coupling elements can be separated after they are manufactured. For adjusting and locating the light wave guides 5, grooves 8 can be etched in front of the microlens 1. FIG. 3 shows an embodiment developed in such manner.

In the optoelectronic coupling element shown in FIG. 3, several spaced receptacles 3 are anisotropically etched into a carrier chip 2. In this embodiment, the grooves 8 are simultaneously etched into the carrier chip 2.

In the embodiment of the invention shown in FIG. 3, a layer of glass solder 4 is used as a connecting means for fastening the micro lenses 1 into the receptacles 3, for fastening the light wave guides 5 into the grooves 8 and covering the carrier chip 2 with a layer of glass solder 4.

The grooves 8 provided for the optic fibers 5 are each arranged in front of the receptacles 3 with the microlenses 1 located in the carrier chip 2. The semiconductor light transducer 6 is behind the microlenses 1.

In the preferred embodiment of the invention, the mounting and adjustment of the microlens 1 takes place according to the following method. A structured metallized insulator, secured on a lead frame having a low conduction, serves as chip carrier. While operating the coupling element, the microlens is adjusted in the x,y direction optimally with respect to the light transducer 6 and the optic fiber 5. The microlens is adjusted to optimally couple the light transducer 6 and optic fiber 5. The adjustment of the microlens takes place in vitrified glass solder and is fixed in its adjusted position by the solidified solder. The adjustment and mounting of the carrier chip 2 on an additional carrier chip 9 takes place analogous to the method for mounting light wave guides described in U.S. Pat. No. 4,741,796. With this method, two electrodes, developed in plier form and fastened on a x,y,z manipulator, adjust the carrier chip 2.

While two embodiments of the optoelectronic coupling element and several modifications thereof have been shown and described in detail herein, various other changes and modifications may be made without departing from the scope of the present invention.

We claim:

1. An optoelectronic coupling element comprising:
   a light wave guide;
   a first carrier chip including a semiconductor light transducer;
   a microlens for optically coupling the light wave guide and the semiconductor light transducer, wherein the microlens is a spherical lens;
   a second silicon carrier chip defining a truncated pyramid-shaped lens receptacle, wherein the first carrier chip is fixed to the second carrier chip such that the semiconductor light transducer is adjacent to the microlens, and the lens receptacle is anisotropically etched into the second carrier chip; and
   glass solder means for fixing the microlens in the lens receptacle.

2. The optoelectronic coupling element of claim 1 wherein the microlens is glass.

3. The optoelectronic coupling element of claim 1 wherein the microlens is sapphire.

4. The optoelectronic coupling element of claim 1 wherein the underside of the second carrier chip is provided with a metallic area.

5. An optoelectronic coupling element comprising:
   a light wave guide;
   a first carrier chip including a semiconductor light transducer;
   a microlens for optically coupling the light wave guide and the semiconductor light transducer, wherein the microlens is a spinal spherical lens;
   a second silicon carrier chip defining a truncated pyramid-shaped lens receptacle, wherein the first carrier chip is fixed to the second carrier chip such that the semiconductor light transducer is adjacent to the microlens, and the lens receptacle is anisotropically etched into the second carrier chip; and
   glass solder means for fixing the microlens in the lens receptacle.

6. An optoelectronic coupling element comprising:
   a light wave guide;
   a first carrier chip including a semiconductor light transducer;
   a microlens for optically coupling the light wave guide and the semiconductor light transducer, wherein the microlens is a optically tempered spherical lens;
   a second silicon carrier chip defining a truncated pyramid-shaped lens receptacle, wherein the first carrier chip is fixed to the second carrier chip such that the semiconductor light transducer is adjacent to the microlens, and the lens receptacle is anisotropically etched into the second carrier chip; and
   glass solder means for fixing the microlens in the lens receptacle.

* * * * *